(12) United States Patent
Yamada

(10) Patent No.: US 8,125,663 B2
(45) Date of Patent: Feb. 28, 2012

(54) USAGE STATUS MANAGEMENT DEVICE, RECORDING MEDIUM STORING USAGE STATUS PROCESSING PROGRAM, USAGE STATUS MANAGEMENT SYSTEM, AND USAGE STATUS MANAGEMENT METHOD

(75) Inventor: Shigeru Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1123 days.

(21) Appl. No.: 11/948,208

(22) Filed: Nov. 30, 2007

(65) Prior Publication Data
US 2009/0002748 A1 Jan. 1, 2009

(30) Foreign Application Priority Data
Jun. 29, 2007 (JP) .................................. 2007-172307

(51) Int. Cl.
G06K 15/00 (2006.01)
H04N 1/32 (2006.01)
(52) U.S. Cl. ...................... 358/1.14; 358/1.16; 358/468
(58) Field of Classification Search .................. 358/468, 358/444, 404, 522, 1.6, 1.9, 1.18, 3.23
See application file for complete search history.

(56) References Cited

U.S. PATENT DOCUMENTS
7,298,511 B2 * 11/2007 Lay et al. ..................... 358/1.15
(Continued)

FOREIGN PATENT DOCUMENTS
JP 10-149052 A 6/1998
(Continued)

OTHER PUBLICATIONS

Japanese Office Action dated Oct. 18, 2011 issued in Japanese Application No. 2007-172307 with English language translation (2 pages).

*Primary Examiner* — Jerome Grant, II
(74) *Attorney, Agent, or Firm* — Sughrue Mion, PLLC

(57) ABSTRACT

A usage status management device, which includes a collection section that collects usage history information of an image forming device, the usage history information including information on a usage of a display operation section of the image forming device, an analysis section that analyzes a usage status of the image forming device based on the usage history information collected by the collection section, and an output control section that controls to output the usage status of the image forming device analyzed by the analysis section.

14 Claims, 10 Drawing Sheets

U.S. PATENT DOCUMENTS

| | | | |
|---|---|---|---|
| 2007/0002357 A1* | 1/2007 | Mori | 358/1.13 |
| 2007/0236717 A1* | 10/2007 | Nishikawa | 358/1.13 |
| 2008/0104350 A1* | 5/2008 | Shimizu et al. | 711/165 |
| 2008/0319930 A1* | 12/2008 | Obana et al. | 706/14 |
| 2009/0009367 A1* | 1/2009 | Hirshberg | 341/22 |
| 2009/0313486 A1* | 12/2009 | Tani | 713/300 |

FOREIGN PATENT DOCUMENTS

| | | |
|---|---|---|
| JP | 2000-163241 A | 6/2000 |
| JP | 2001-250008 A | 9/2001 |

* cited by examiner

USAGE STATUS MANAGEMENT DEVICE, RECORDING MEDIUM STORING USAGE STATUS PROCESSING PROGRAM, USAGE STATUS MANAGEMENT SYSTEM, AND USAGE STATUS MANAGEMENT METHOD

CROSS-REFERENCE TO RELATED APPLICATION

This application is based on and claims priority under 35 USC 119 from Japanese Patent Application No. 2007-172307 filed on Jun. 29, 2007.

BACKGROUND

1. Technical Field

The present invention relates to a usage status management device, a recording medium storing a usage status processing program, a usage status management system, and a usage status management method.

2. Related Art

In general, due to its specification, an image forming device equipped with plural functions, including copying, scanning, or facsimile, stops outputting formed images while a display operation section is being used to copy, send a facsimile, or perform other functions.

However, when a usage status of the image forming device is obtained, both of the usage statuses of the display operation section and the image formation output are not taken into consideration. Thus, it cannot be always said that the usage status of the image forming device is properly obtained.

SUMMARY

An aspect of the present invention provides a usage status management device, which includes a collection section that collects usage history information of an image forming device, the usage history information including information on a usage of a display operation section of the image forming device, an analysis section that analyzes a usage status of the image forming device based on the usage history information collected by the collection section, and an output control section that controls to output the usage status of the image forming device analyzed by the analysis section.

BRIEF DESCRIPTION OF THE DRAWINGS

Exemplary embodiments of the present invention will be described in detail based on the following figures, wherein.

DETAILED DESCRIPTION

Hereinbelow, examples of a usage status management device, a recording medium storing a usage status processing program, a usage status management system, and a usage status management method according to the present invention will be described with reference to the attached drawings.

First Example

Figure 1:
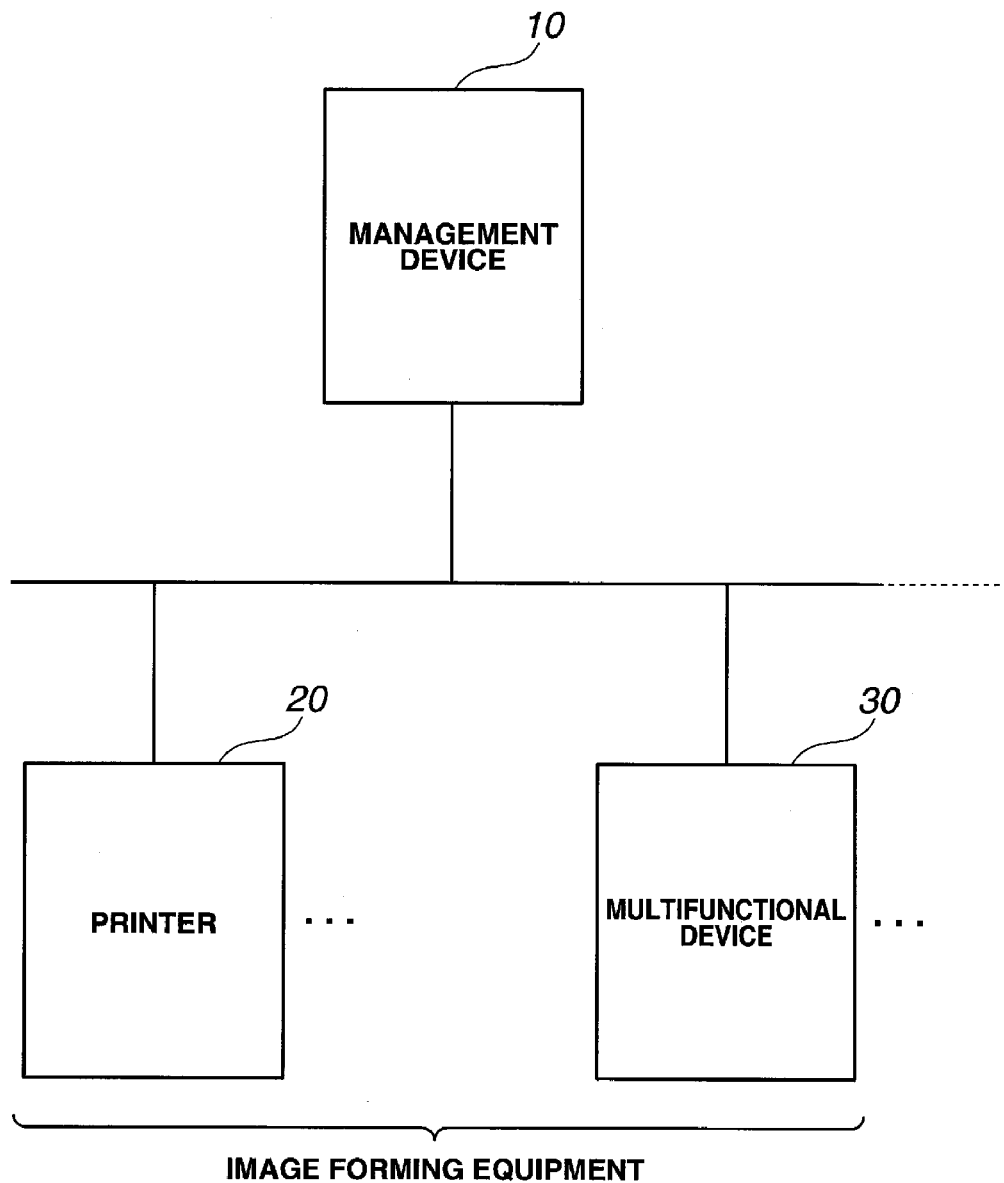
FIG. 1 is a diagram showing an example of an overall configuration of a usage status management system according to one exemplary embodiment of the present invention.

FIG. 1 is a diagram showing one example of an overall configuration of the usage status management system according to one exemplary embodiment of the present invention.

In the usage status management system, a management device 10, one or more printers 20 and a multifunctional device 30 are connected through a network formed with LAN (Local Area Network), WAN (Wide Area Network) and so on. In the network, a personal computer (client) or other various servers may be connected.

The management device 10 performs a function of managing the system. In First Example, especially, the management device 10 performs processes including collection of information regarding a device usage status in the printer 20 and the multifunctional device 30, analysis of the collected information, output control of the device usage status obtained by the analysis, and so on. Here, the device usage status indicates how often the device is used by a user, for example.

The printer 20 and the multifunctional device 30 perform a function of forming and printing out an image on printing sheet or other recording media. It should be noted that the multifunctional device 30 in First Example is an image forming equipment having functions including, in whole of in part, copying, scanning, facsimile, emailing, printing out of images taken by a digital camera, various system coordinations, WebUI and so on. Hereinafter, equipment having image forming functions, such as the printer 20 and the multifunctional device 30, is collectively referred to as the image forming equipment.

A processing flow of outputting the usage status of the image forming equipment (display, image forming output and so on) using the management system 10 will be briefly described for the sake of easily understanding the explanation of the usage status management system in First Example. It should be noted that, in First Example, a utilization rate for each of the image forming equipment is used as an indicator for measuring the usage status of the image forming equipment.

To output the usage status of the image forming equipment, the management device 10 firstly collects a usage history from each of the image forming equipment. The usage history to be collected means, for example, duration of time that the image forming equipment is powered on, the number of outputted formed images, duration of time that the operation panel is used and so on.

After completing the collection, the management device 10 then calculates the utilization rate for each of the image forming equipment based on the collected information. In addition to a general utilization rate based on the number of outputted sheets and so on, which are conventionally used, the utilization rate described above includes a utilization rate based on the duration of time that the operation panel is used, and is calculated, for example, in accordance with the following expression.

> Utilization rate (%)=((the number of outputted formed images/(power on time (minute)×PPM))+(usage time of operation panel (minute)/(power on time (minute))))×100

(PPM: Print Per Minute (the number of printed sheets per minute specified in the specifications))

After calculating the utilization rate through the procedure above, the management device 10 displays information including the utilization rate of each of the image forming device calculated based on an instruction from an administrator and so on, or causes an image forming equipment to output the formed image. The outputted formed image may be referenced and used by the administrator and so on to provide an arrangement of equipment. In this case, a utilization rate that includes the usage time of operation panel is obtained. Thus, for example, in a case where the utilization rate of the multifunctional equipment 30 is higher than that of the printer 20, a prospect that a demand for panel operation is higher than that for only output of formed image, and so on, may be obtained.

Next, an example of functional configuration of the management device 10 will be described with reference to FIG. 2. The management device 10 includes, as its functional configuration, a communication section 11, a storage section 12, a controller 13, a display 14 and an input section 15.

The communication section 11 includes a network card and so on, and performs a function of communication interface that controls the communication between the management device 10 and other devices. Through the communication section 11, the management device 10 sends and receives data to/from the printer 20, the multifunctional device 30 and so on.

The storage section 12 includes a HDD (Hard Disk Drive) and so on, and performs a function of storage device that stores various data. The various data stored in the storage section 12 includes various programs such as an operation system and an application, setting information required at the time of implementing various processes, and so on.

The controller 13 includes a CPU (Central Processing Unit), and a memory such as a ROM (Read Only Memory) and a RAM (Random Access Memory), and performs a function of centrally controlling processes in the management device 10. The CPU reads and implements the program stored in the storage section 12 while using the memory as a work area, whereby various processes in the management device 10 are implemented.

The display 14 includes a display unit and so on, and performs a function of displaying various information. The input section 15 includes a keyboard, a mouse and so on, and performs a function of inputting instructions from a user to the device.

Next, an example of functional configuration of the controller 13 described above will be described.

The controller 13 includes, as its functional configuration, a usage history collection section 41, an equipment database management section 42, a weight data management section 43, a usage status analysis section 44, a printing controller 45 and a display controller 46.

The usage history collection section 41 performs a function of collecting a usage history from the image forming equipment. In First Example, by collecting processing logs from the image forming equipment, the usage history collection section 41 collects the usage history of the image forming equipment. It should be noted that the collection of the usage history of the image forming equipment may also be performed through anything other than the processing logs. For example, the collection of the usage history may be performed through the MIB (Management Information Base) and so on. For example, the usage histories to be collected above include, in whole or in part, the power on time of the image forming equipment, the number of outputted formed images, length of time that the operation panel is used, and so on.

The equipment database management section 42 performs a function of managing an equipment database 12*a*. The equipment database 12*a* stores, in advance; information regarding equipment, such as a type of image forming equipment, a configuration, a print (outputting the formed images) speed specified in the specifications and a network address; and information regarding the user. In the equipment database 12*a*, the usage histories collected by the usage history collection section 41 are stored in association with such information. It should be noted that the information such as the type of image forming equipment, the configuration, the print speed specified in the specifications and the network address is not necessarily stored in advance, and, for example, may be stored in the equipment database 12*a* based on the usage histories, provided that such information is included in the usage histories.

The weight data management section 43 performs a function of managing weight data. The weight data is data used for analyzing the usage status. Since the load on the equipment itself and the occupation time vary depending on functions used in the image forming equipment, the weight data performs a function of absorbing the variation. For example, comparing the output of image formation with the panel operation, since there is a high possibility, at the time of outputting the image formation, that consumables are used or paper jams occur in an output tray, the load on the equipment or the occupation time becomes increased as compared with the panel operation. Therefore, for example, a weighting coefficient is set by giving weight of half of the output of image formation to the panel operation (in this case, the weight coefficient becomes 0.5). Then, the calculation of the utilization rate is performed in accordance with the weighting coefficient.

The usage status analysis section 44 performs a function of analyzing the usage status of the image forming equipment, and includes a utilization rate calculation section 44*a* that calculates the utilization rate, an overlap processing time calculation section 44*b* that calculates an overlapping processing time, and an overlap processing rate calculation section 44*c* that calculates an overlapping processing rate. The detailed description of the overlap processing time calculation section 44*b* and the overlap processing rate calculation section 44*c* will be made later. In First Example, at the time of analyzing the usage status, the utilization rate calculation section 44*a* calculates the utilization rate based on the processing logs collected from each of the image forming equipment. The calculation of the utilization rate is performed using information in the equipment database 12*a* managed in the equipment database management section 42 described above, the weight data managed in the weight data management section 43 and so on.

The printing controller 45 performs a function of controlling printing in the image forming equipment. Specifically, the printing controller 45 sends an instruction to form images, including a prescribed information, to the printer 20, the multifunctional device 30 and so on, and prints out based on the instruction. The display controller 46 performs a function of controlling display of various screens in the display 14.

Next, an example of functional configuration of the image forming equipment will be described using FIG. 3. It should be noted that in the following description an example using the multifunctional device 30 will be described as a typical example.

The multifunctional device 30 includes, as its functional configuration, a communication section 31, a display operation section 32, a controller 33, a storage section 34, an image forming section 35 and an image reading section 36.

The communication section 31 includes a network card and so on, and performs a function of the communication interface that controls the communication between the multifunctional device 30 and other devices. Through this communication section 31, the multifunctional device 30 sends and receives data to/from the management device 10.

The display operation section 32 includes an operation panel and so on, and performs a function of the user interface that connects the user with the multifunctional device 30. The display operation section 32 is provided with an operation section 32a that includes a touch panel, a hard button and so on, and performs a function of inputting instructions from the user to the device, and a display 32b that includes an LED (Light Emitting Diode), an LCD (Liquid Crystal Display) and so on, and performs an function of displaying various information. The display operation section 32 in the multifunctional device 30, for example, may have a Web browser and so on, and realize a WebUI function.

The controller 33 includes a CPU, and a memory such as a ROM and a RAM, and performs a function of centrally controlling processes in the multifunctional device 30 based on programs stored in the ROM and so on. The controller 33 further includes a usage history management section 51 that generates and manages, as processing logs, the usage history including the usage time of operation panel, the number of outputted formed images and so on, a job controller 52 that controls entire processes regarding the image forming jobs based on the instructions for image formation.

The storage section 34 includes a HDD and so on, and performs a function of the storage device that stores various data. The various data stored in the storage section 34 include various programs, which includes the operation system, setting information required at the time of implementing various processes and so on.

The image forming section 35 includes a photosensitive drum, a transfer belt, a fixing unit and so on, and performs a function of forming and printing images on the recording medium such as printing sheets. It should be noted that in First Example a case where the image forming section 35 is of electrophotographic type will be described as one example. However, the configuration is not limited to this, and other types (e.g. inkjet type) may be applicable. Additionally, in First Example, even if there is an image forming job waiting for image formation in the device, such image forming job is held and image formation in the image forming section 35 is suspended during the time when the processing other than this image forming job, the image display using the panel operation or the like is performed (operation panel usage mode).

The image reading section 36 includes an illuminating lamp, a lens, a CCD (Charge Coupled Device) and so on, and performs a function of optically scanning a paper sheet placed on a platen glass, and reading image information from the paper sheet. These are the description of various processing functions of the multifunctional device 30. It should be noted that the description of the printer 20 is omitted from the above description. In general, the printer 20 has a configuration in which the image reading section 36 and the like is removed from the configuration of the multifunctional device 30 described above. Additionally, the printer 20 in First Example has functions mainly for forming images, and does not have the WebUI function or other functions other than image forming function.

Figure 2:
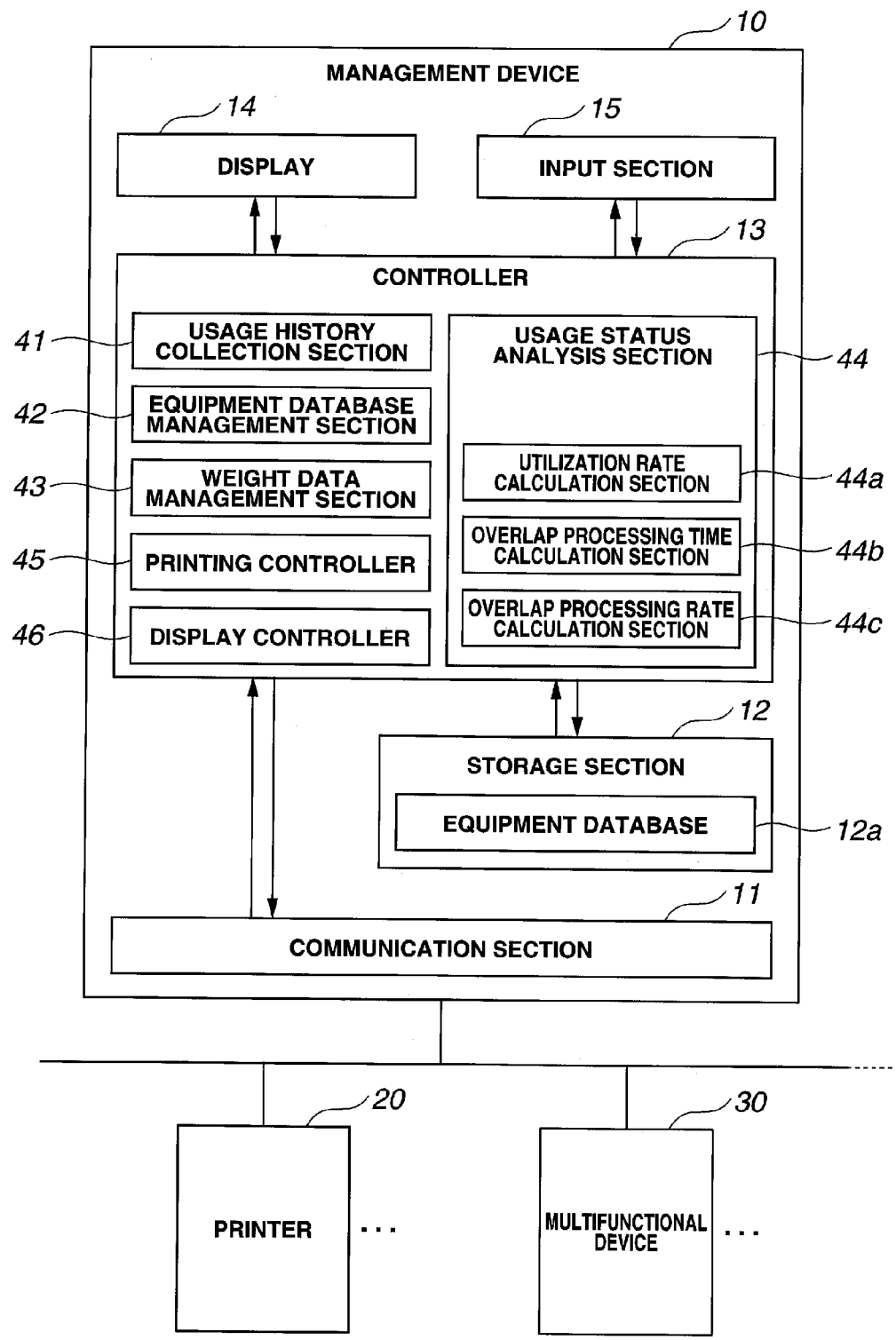
FIG. 2 is a diagram showing one example of a functional configuration of a management device 10 shown in FIG. 1.
Figure 3:
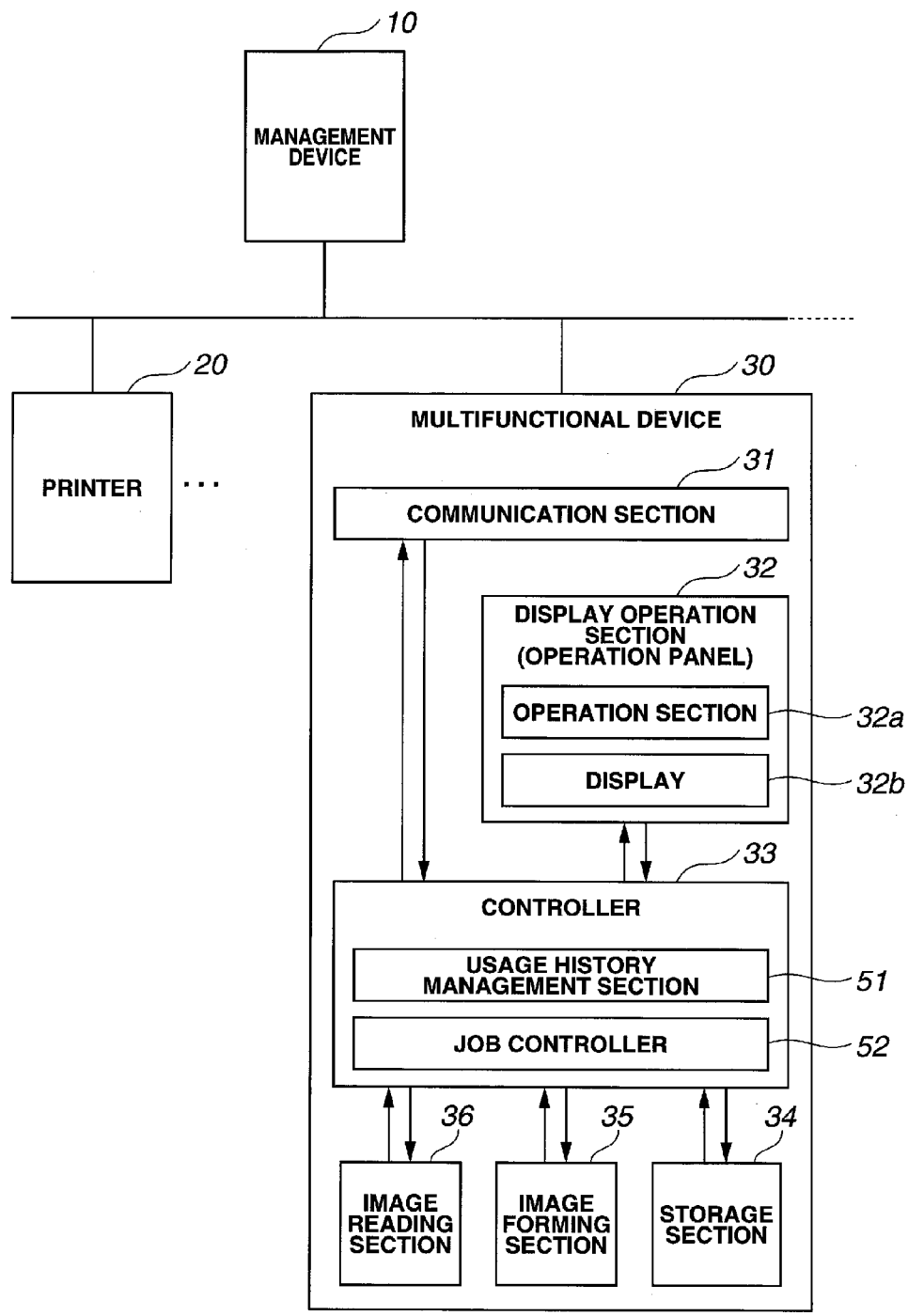
FIG. 3 is a diagram showing one example of a functional configuration of an image forming equipment shown in FIG. 1.
Figure 4:
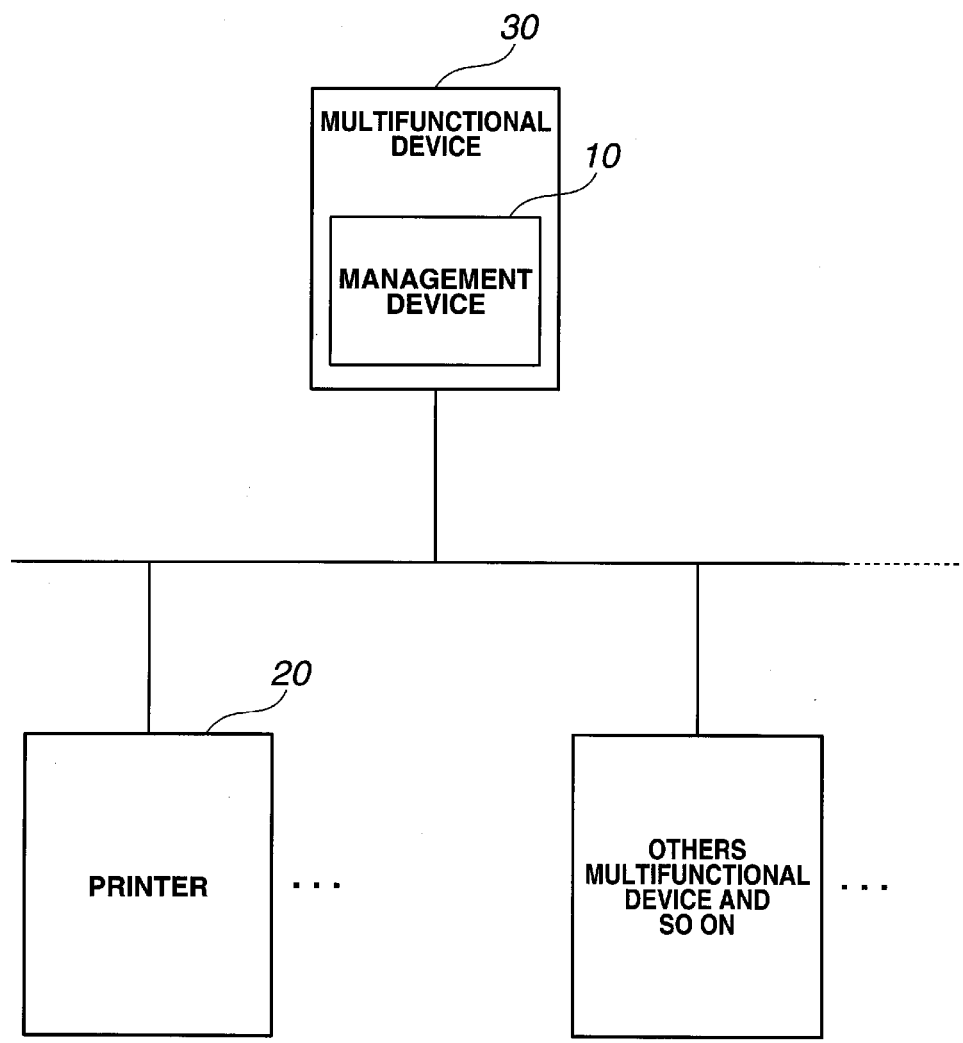
FIG. 4 is a diagram showing one modified example of an overall configuration of the usage status management system shown in FIG. 1.

In the above description, each of the devices making up the usage status management system is described using FIGS. 2 and 3. For the purpose of facilitating the understanding, the above description provides an example configuration in which each of the processing functions is specifically realized. However, this is only one example configuration, and each of the processing functions may be realized by configurations other than this configuration. Additionally, the functional configuration of the management device 10 and the multifunctional device 30 described above is not necessarily achieved as shown in the figures above. It is required only that the functional configuration of the management device 10 and the multifunctional device 30, in whole or in part, be realized in any of the devices within the usage status management system. For example, it is possible to employ a configuration in which the usage status is analyzed in each of the image forming equipment while the management device 10 collects and outputs (display, output the formed image and so on) the information. Additionally, although, in the above description, the example case where the management device 10 and the multifunctional device 30 are different devices is described, the management device 10 may be incorporated in the multifunctional device 30 as shown in FIG. 4. In such case, the multifunctional device 30 both analyzes and outputs (display, output of formed images and so on) the usage status information.

Next, with reference to FIGS. 5 through 8, the usage time of operation panel in the multifunctional device 30 will be described. Hereinbelow, a condition of the operation panel in the multifunctional device 30 under which the usage time of operation panel is identified will be described by providing examples.

Figure 5:
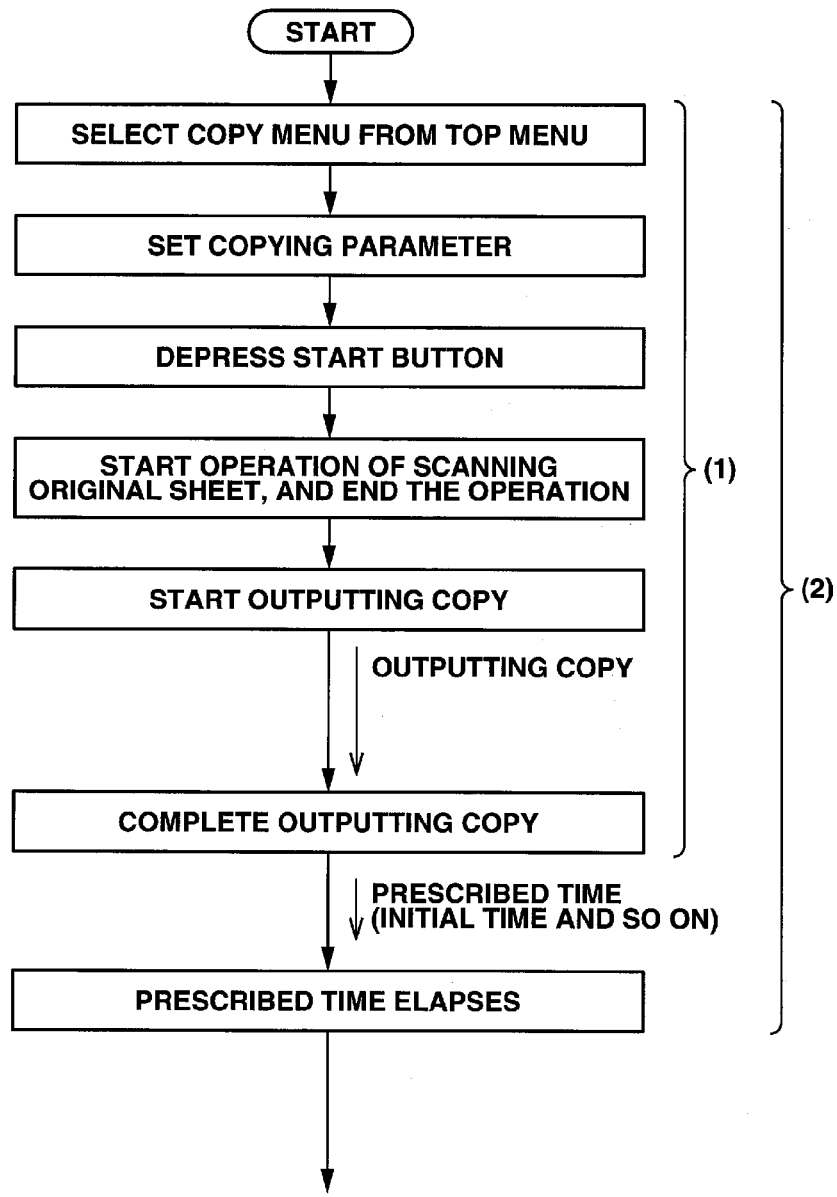
FIG. 5 is a first diagram for explaining one example of utilization time of operation panel.

Firstly, with reference to FIG. 5, a case of copying processing using the panel operation will be described. The process flow at the time of copying in the multifunctional device 30 is as follows: opening a copy menu screen from a top menu screen; setting a parameter for copying; depressing a start button (starting copying); starting operation of scanning an original document; and then, starting outputting a copied document. The usage time of operation panel in this case is from time when the operation from the operation panel is started (time when the copy menu screen is opened from the top menu screen) to time when outputting is completed. It should be noted that a prescribed time period (e.g. time period required for initialization of the multifunctional device 30) after outputting is completed may be included in the usage time of operation panel for copying processing.

Figure 6:
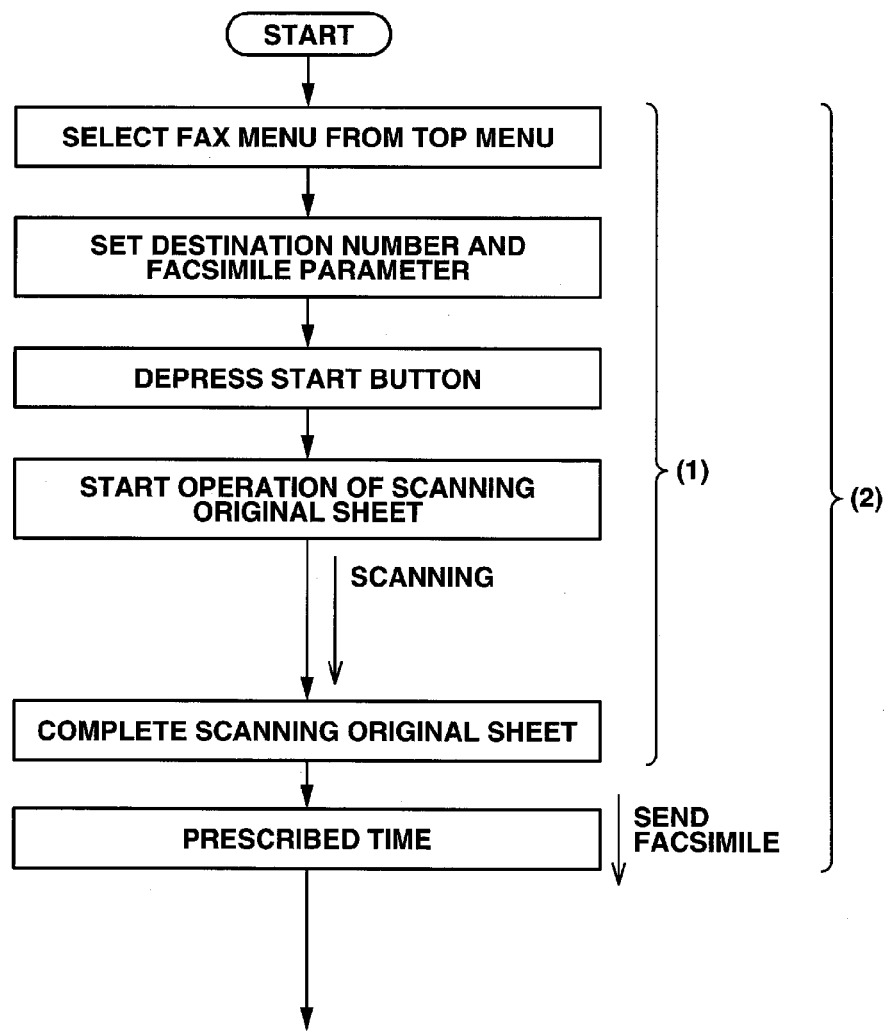
FIG. 6 is a second diagram for explaining one example of utilization time of operation panel.

Next, with reference to FIG. 6, a case of sending a fax using the panel operation will be described. The process flow at the time of sending a fax in the multifunctional device 30 is as follows: opening a fax menu screen from the top menu screen; setting a destination fax number or a parameter for sending the fax; depressing a start button (starting sending the fax); starting operation of scanning an original document; and then, the operation is completed. The usage time of operation panel in this case is from time when the operation from the operation panel is started (time when the fax menu screen is opened from the top menu screen) to time when scanning the original document is completed. A prescribed time period (e.g. waiting time for continuous operation by the user) after scanning the original document is completed may be included in the usage time of operation panel for sending a fax. It should be noted that the image forming section 35 is in the idling condition at the time of sending the fax. And, it can be considered that the user who sends the fax is in front of the image forming device. In this situation, if an image forming job received via a network is processed or forming the image received by the fax is performed, there is a possibility that such user looks at the outputted formed image. Thus, from the viewpoint of strengthening the security, the image forming section 35 may be controlled so as to suspend forming of the image.

Figure 7:
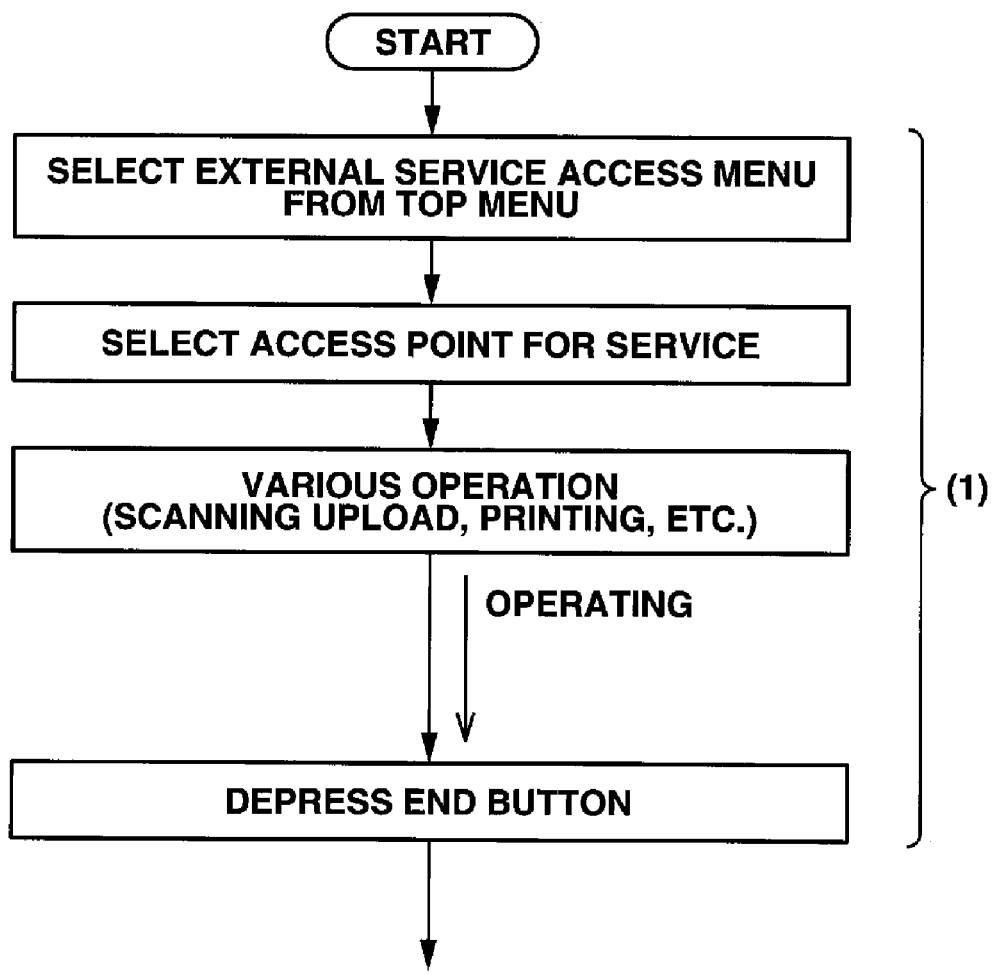
FIG. 7 is a third diagram for explaining one example of utilization time of operation panel.

Next, with reference to FIG. 7, a case of using the Web using the panel operation will be described. The process flow at the time of using the Web in the multifunctional device 30 is as follows: opening an external service access screen from the top menu screen; selecting an access point for the service; performing various operations after the access; and then, depressing an end button (ending the external service access). The usage time of operation panel in this case is from time when the operation from the operation panel is started (time when the external service access screen is opened from the top menu screen) to time when the end button is depressed. It should be noted that it is possible to employ a configuration in which, even when the end button is not explicitly depressed, if any operation is not performed during a prescribed time, the external service access screen may be ended, considering it as time-out, and measuring the usage time of operation panel is ended.

Figure 8:
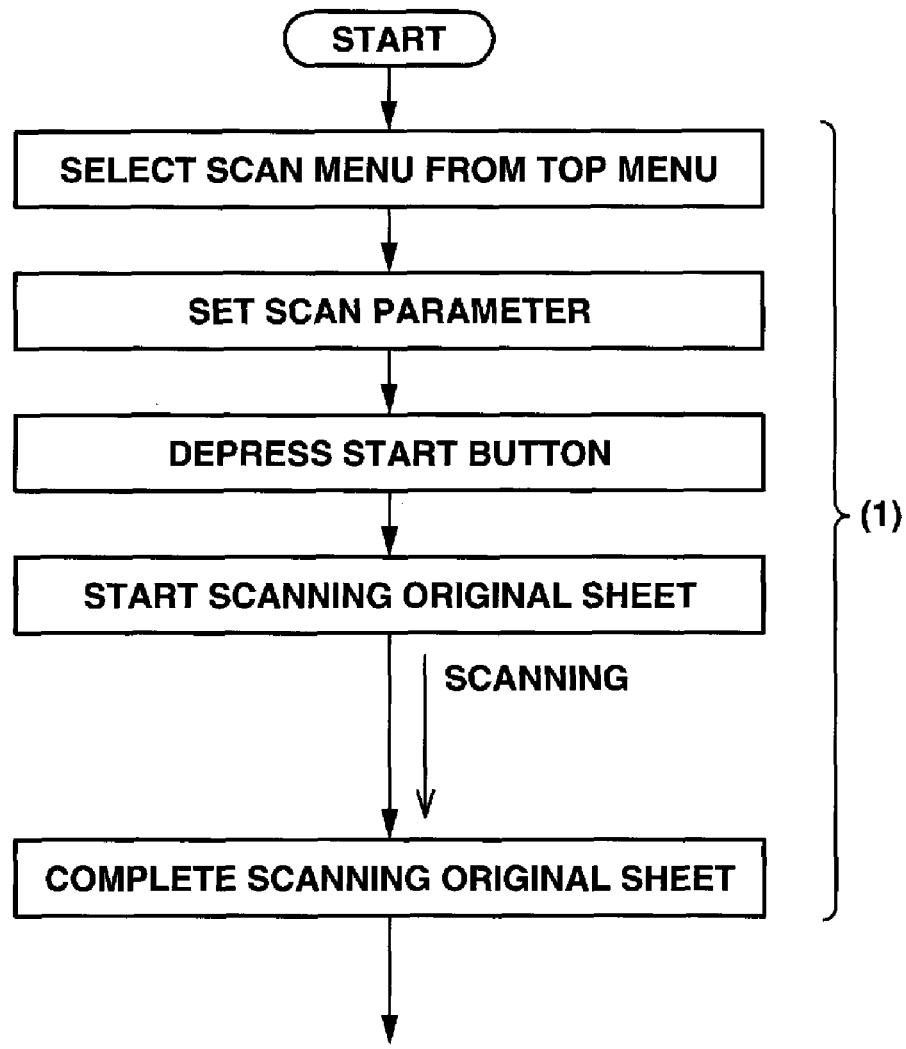
FIG. 8 is a fourth diagram for explaining one example of utilization time of operation panel.

Next, with reference to FIG. 8, a case of scanning processing using the panel operation will be described. The process flow at the time of scanning in the multifunctional device 30 is as follows: opening a scan menu screen from the top menu screen; setting a parameter for scanning; depressing a start button (starting scanning); starting operation of scanning an original document; and then, the operation is completed. The usage time of operation panel in this case is from time when the operation from the operation panel is started (time when the scan menu screen is opened from the top menu screen) to time when scanning the original document is completed. It should be noted that, although the image forming section 35 is in the idling condition at the time of scanning, in the multifunctional device 30 in First Example, a screen indicating that the scanning is in operation is being displayed at the time of scanning the original document, and forming the image in the image forming section 35 is suspended.

These are the description of the usage time of operation panel. However, the description above is only one example. For the case other than the above cases, it is possible to identify the usage time of operation panel as described above.

Figure 9:
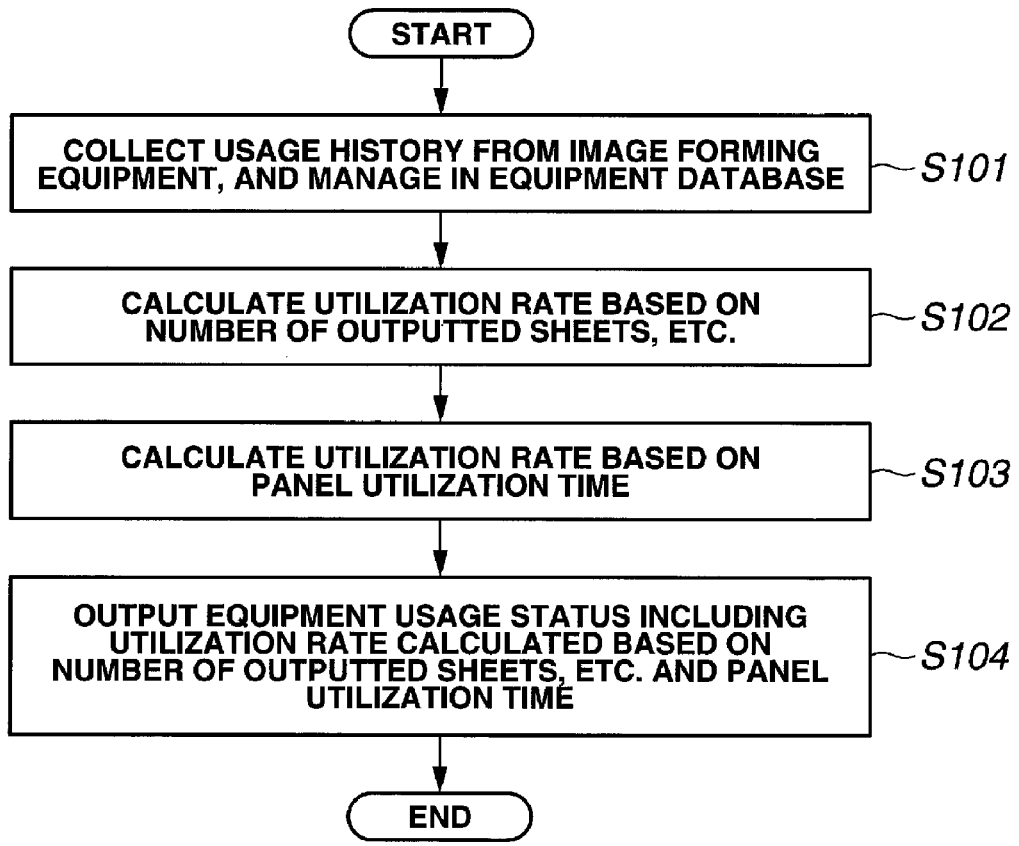
FIG. 9 is a flowchart showing an operational flow of the management device 10 shown in FIG. 1.

Next, with reference to FIG. 9, an operation flow in the management device 10 described with reference to FIG. 1 will be described. It should be noted that a description will be made below as to the operation flow when the usage status of each of the image forming equipment is outputted.

At the time of outputting the usage status, in the management device 10, firstly, the usage history collection section 41 collects the usage histories from each of the image forming equipment, while the equipment database management section 42 manages the collected information (step S101). It should be noted that the collection of the usage histories in the step S101 is not necessarily performed at this timing. The collection may be automatically performed at a prescribed time (collection in accordance with schedule) and so on.

Next, the utilization rate calculation section 44*a* in the management device 10 calculates the utilization rate based on the number of outputted sheets and so on (step S102). The utilization rate based on the number of outputted sheets is obtained through a general calculation of utilization rate that is conventionally performed, and is calculated using such information as duration of time that the image forming equipment is powered on during a prescribed period, the number of outputted sheets, the print speed specified in the specifications (PPM:Print Per Minute).

In addition to the utilization rate based on the number of outputted sheets, the utilization rate calculation section 44*a* calculates the utilization rate based on the usage time of operation panel (step S103). The utilization rates in steps S102 and S103 are calculated, for example, in accordance with the following expression.

Utilization rate (%)=((the number of outputted formed images/(power on time (minute)×PPM))+(usage time of operation panel (minute)/(power on time (minute))))×100

It should be noted that, to calculate the utilization rate while applying a prescribed weighting to the panel operation, a weighting coefficient (in this case, 0.5) is multiplied at the time of calculating the utilization rate based on the usage time of operation panel. For example, the calculation is performed in accordance with the following expression.

Utilization rate (%)=((the number of outputted formed images/(power on time (minute)×PPM))+(usage time of operation panel (minute)/(power on time (minute))×0.5)×100

After the utilization rate is calculated in these ways, the management device 10 causes the display controller 46 to display the calculated utilization rate on the display unit, or the printing controller 45 to output the formed image from the image forming equipment (step S104). And then, the processing is ended.

These are the description of the operation flow of the management device 10. It should be noted that the utilization rate based on the panel operation and the outputted formed image can be utilized as supporting data at the time of proposing the equipment arrangement by comparing with a predetermined optimum utilization rate (e.g. 3%-5%).

Second Example

Next, Second Example will be described. In Second Example, a description will be made of, in addition to First Example, a case where the utilization rate of the image forming equipment is analyzed further considering the waiting time for formation of image arising from using the panel operation. It should be noted that, since a configuration and operation in Second Example are similar to the description in First Example above, a description will be made of only a calculation method below of an overlapping processing time and an overlapping processing rate between the usage time of operation panel and the waiting time for formation of image. The overlapping processing time is calculated in the overlap processing time calculation section 44*b* as illustrated in FIG. 2 above, and the overlapping processing rate is calculated in the overlap processing rate calculation section 44*c* as illustrated in FIG. 2 above.

Figure 10:
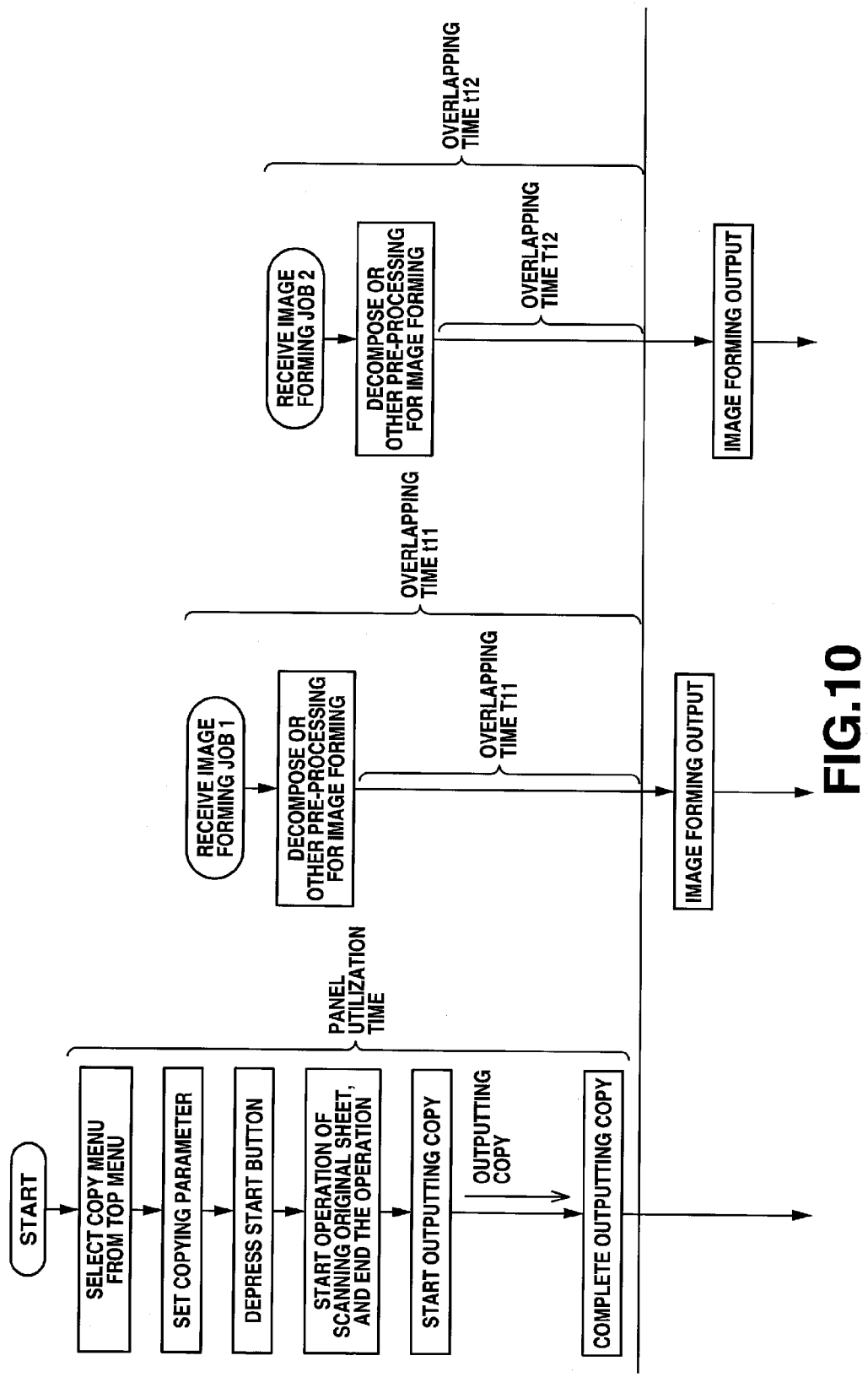
FIG. 10 is a diagram for explaining one example of overlapping processing time.

For the overlap described above, an example in which an image formation job is received from the outside during copying using the panel operation will be given as shown in FIG. 10. In this case, an image formation job 1 and an image formation job 2 are received during copying operation. At this time, in the image forming equipment, the image formation job is put on hold and the image formation in the image forming section 35 is suspended as described above. At the same time, decomposition or other pre-processing for image formation is performed for the image formation job 1 and the image formation job 2, and these jobs are processed to a condition that the image formation can be performed immediately after the panel operation is completed. In FIG. 10, the overlapping processing time is from a time when the image formation job is received during the panel operation to a time when the output of the image formation based on the job is started.

The overlapping processing time at this time is calculated by the following expression.

(Total) overlapping processing time ($t1$)=overlapping processing time ($t11$)+overlapping processing time ($t12$)

It should be noted that, when the image forming equipment can obtain the processing logs of the specific processing time and so on, the overlapping processing time may be set to from a time when the output of the image formation is originally to be started to a time when the output of the image formation is actually started. In this case, the overlapping processing time can be calculated using the following expression.

(Total) overlapping processing time ($T1$)=overlapping processing time ($T11$)+overlapping processing time ($T12$)

These are the description of the example case where two image formation jobs are suspended during copying operation using the panel operation. Additionally, even when there occur the third and fourth jobs that wait to be operated, the overlapping processing time can be similarly calculated by cumulatively adding the waiting time for the jobs.

Additionally, for example, when there occur n different overlaps within the time period when the image forming equipment is powered on, the overlapping processing rate can be calculated in accordance with the following expression.

Overlapping processing rate (%)=(($t1+t2+ \ldots +tn$)/power on time)×100

It should be noted that, in FIG. 10, the usage time of operation panel during copying operation is ended "at the time when the copying output is completed." However, as described with reference to FIG. 5 above, a prescribed time period (e.g. time period required for initialization) may be included in the usage time of operation panel.

These are the description of one typical example of exemplary embodiment of the present invention. However, the present invention is not limited to the example as described above and illustrated in the figures, and may be appropriately modified and implemented without departing from the spirit and scope thereof.

It should be noted that the program operated in the management device 10 and the image forming equipment can be provided not only through such communication means as the network, but also by being recorded in such external recording medium as CD-ROM.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A usage status management device, comprising:
a collection section that collects usage history information of an image forming device, the usage history information including information on a usage of a display operation section of the image forming device;
an analysis section that analyzes a usage status of the image forming device based on the usage history information collected by the collection section; and
an output control section that controls to output the usage status of the image forming device analyzed by the analysis section.

2. The usage status management device according to claim 1, wherein
the analysis section comprises an overlapping process time calculation section that calculates an overlapping process time between a first process of using the display operation section and a second process for forming an image by an image forming section.

3. The usage status management device according to claim 2, wherein
the overlapping process time calculation section calculates, as the overlapping process time, waiting time for an image formation output of the image forming section, the waiting time arising from using the display operation section.

4. The usage status management device according to claim 2, wherein
the overlapping process time calculation section calculates, as the overlapping process time, a cumulative time of waiting time for an image formation output of the image forming section, the waiting time arising from using the display operation section.

5. The usage status management device according to claim 1, wherein
the analysis section comprises an overlap process rate calculation section that calculates, based on the usage history information, a rate of an overlapping process time between a first process of using the display operation section and a second process for forming an image by an image forming section in a total operation time of the image forming device.

6. The usage status management device according to claim 5, wherein
the overlapping process rate calculation section calculates a ratio of a cumulative time of waiting time for an image formation output of the image forming section, the waiting time arising from using the display operation section in a total operation time of the image forming device.

7. A non-transitory computer readable recording medium storing a usage status processing program for causing a computer to execute a process, the process comprising:
collecting usage history information of an image forming device, the usage history information including information on a usage of a display operation section of the image forming device;
analyzing a usage status of the image forming device based on the collected usage history information; and
controlling to output the analyzed usage status.

8. A usage status management system, comprising:
a collection section that collects usage history information of an image forming device, the usage history information including information on a usage of a display operation section of the image forming device;
an analysis section that analyzes a usage status of the image forming device based on the usage history information collected by the collection section; and an output control section that controls to output the usage status of the image forming device analyzed by the analysis section.

9. A usage status management method, comprising:
collecting usage history information of an image forming device, the usage history information including information on a usage of a display operation section of the image forming device;
analyzing a usage status of the image forming device based on the collected usage history information; and
controlling to output the analyzed usage status.

10. The usage status management method according to claim 9, wherein analyzing the usage status comprises:
calculating an overlapping process time between a first process of using the display operation section and a second process for forming an image by an image forming section.

11. The usage status management method according to claim 10, wherein the overlapping process time comprises a waiting time for an image formation output of the image forming section, the waiting time arising from using the display operation section.

12. The usage status management method according to claim 10, wherein the overlapping process time comprises a cumulative time of waiting time for an image formation output of the image forming section, the waiting time arising from using the display operation section.

13. The usage status management method according to claim 9, wherein analyzing the usage status comprises:
calculating, based on the usage history information, a rate of an overlapping process time between a first process of using the display operation section and a second process for forming an image by an image forming section in a total operation time of the image forming device.

14. The usage status management method according to claim 13, wherein analyzing the usage status further comprises:
calculating a ratio of a cumulative time of waiting time for an image formation output of the image forming section, the waiting time arising from using the display operation section in a total operation time of the image forming device.

* * * * *